(12) United States Patent
Yang et al.

(10) Patent No.: US 8,970,833 B2
(45) Date of Patent: Mar. 3, 2015

(54) METHOD AND SYSTEM OF DETECTING TILT ANGLE OF OBJECT SURFACE AND METHOD AND SYSTEM OF COMPENSATING THE SAME

(71) Applicant: Industrial Technology Research Institute, Hsinchu (TW)

(72) Inventors: Ying-Hui Yang, Kaohsiung (TW); Chun-Ming Chen, Hualien County (TW); Hui-Ta Cheng, Tainan (TW); Sung-Ho Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 114 days.

(21) Appl. No.: 13/794,821

(22) Filed: Mar. 12, 2013

(65) Prior Publication Data

US 2014/0176938 A1   Jun. 26, 2014

(30) Foreign Application Priority Data

Dec. 24, 2012   (TW) .............................. 101149578 A

(51) Int. Cl.
 *G01B 11/26* (2006.01)
 *G01C 1/00* (2006.01)
 *G01B 21/04* (2006.01)

(52) U.S. Cl.
 CPC .............. *G01B 11/26* (2013.01); *G01B 21/045* (2013.01)
 USPC ........................................................ 356/138

(58) Field of Classification Search
 CPC .................................................. G01B 11/272
 USPC .................................. 356/138–155, 601–613, 356/139.04–139.08, 139.1, 141.5, 147
 See application file for complete search history.

(56) References Cited

U.S. PATENT DOCUMENTS 3,928,790 A    12/1975   Schmall
4,541,723 A *   9/1985   Pirlet ............................ 356/602
4,606,645 A    8/1986   Matthews et al.
(Continued)

FOREIGN PATENT DOCUMENTS

CN       102089619       6/2011
EP        2306142        4/2011
(Continued)

OTHER PUBLICATIONS

Lu et al., "Image-Based System for Measuring Objects on an Oblique Plane and Its Applications in 2-D Localization," IEEE Sensors Journal 12 (6), Jun. 2012, pp. 2249-2261.

(Continued)

*Primary Examiner* — Kara E Geisel
*Assistant Examiner* — Dominic J Bologna
(74) *Attorney, Agent, or Firm* — Jianq Chyun IP Office

(57) ABSTRACT

A method and a system of detecting a tilt angle of an object surface and a method and a system of compensating the same are provided. The detecting method includes the following steps. Light beams are projected by a light source device to the object surface. An image of the object surface is captured so as to obtain light spots on the object surface. A focus program is executed by adjusting a vertical distance between the light source device and the object surface, so as to gather the light spots in a focal point on the object surface. The vertical distance is adjusted, and a correction angle between the light beams and the object surface is calculated according to the light spots.

24 Claims, 11 Drawing Sheets

(56) References Cited

U.S. PATENT DOCUMENTS

| | | | |
|---|---|---|---|
| 5,929,983 | A | 7/1999 | Lu |
| 6,205,243 | B1 * | 3/2001 | Migdal et al. ............... 382/154 |
| 6,304,050 | B1 | 10/2001 | Skaar et al. |
| 6,480,802 | B1 * | 11/2002 | Flormann ..................... 702/127 |
| 6,727,994 | B2 | 4/2004 | Hsieh et al. |
| 7,092,105 | B2 * | 8/2006 | Lim et al. ..................... 356/601 |
| 2004/0184653 | A1 | 9/2004 | Baer et al. |
| 2005/0062939 | A1 * | 3/2005 | Tamura ........................... 353/69 |
| 2008/0297921 | A1 | 12/2008 | Kodaira |
| 2012/0206706 | A1 | 8/2012 | Hsu et al. |

FOREIGN PATENT DOCUMENTS

| | | |
|---|---|---|
| TW | 200535398 | 11/2005 |
| TW | 200908015 | 2/2009 |
| TW | 201128164 | 8/2011 |

OTHER PUBLICATIONS

Hsu et al., "A Novel Fiber Alignment Shift Measurement and Correction Technique in Laser-Welded Laser Module Packaging," Journal of Lightwave Technology 23 (2), Feb. 2005, pp. 486-494.

Cousin et al, "An auto-focus system for reproducible focusing in laser ablation inductively coupled plasma mass spectrometry," Spectrochimica Acta Part B: Atomic Spectroscopy 50B (1), Jan. 1995, pp. 63-66.

Girao et al., "An Overview and a Contribution to the Optical Measurement of Linear Displacement," IEEE Sensors Journal 1 (4), Dec. 2001, pp. 322-331.

Raghuramaiah et al., "Simultaneous measurement of pulse front tilt and pulse duration of a femtosecond laser beam," Optics Communications 223, Jul. 15, 2003, pp. 163-168.

"Notice of Allowance of Taiwan Counterpart Application", issued on Aug. 26, 2014, p. 1-p. 4, in which the listed references were cited.

* cited by examiner

METHOD AND SYSTEM OF DETECTING TILT ANGLE OF OBJECT SURFACE AND METHOD AND SYSTEM OF COMPENSATING THE SAME

CROSS-REFERENCE TO RELATED APPLICATION

This application claims the priority benefit of Taiwan application serial no. 101149578, filed on Dec. 24, 2012. The entirety of the above-mentioned patent application is hereby incorporated by reference herein and made a part of this specification.

TECHNICAL FIELD

The disclosure relates to a method and a system of detecting a tilt angle of an object surface and a method and a system of compensating the same.

BACKGROUND

In nowadays, when purchasing consumer products, consumers not only consider the functionalities but also gradually pay attention to the product appearances, such that processing molding methods of appearance elements of the consumer products become diversified and important. Accordingly, applications and demands for performing processing procedures, such as cutting, welding, drilling, mold micro-machining and so forth, on a non-plane object or a workpiece become more widespread.

A processing machine performs a positioning process by using a laser light source to project on the workpiece, and enables the processing equipment to perform a processing procedure according to positioning point. If a processing surface is a curved or a non-plane surface, the pros and cons of the processing effect will be directly influenced by a relationship between a focal-point position of the laser light source and a tilt angle on the processing surface. If an operator desires to perform an automated processing procedure on workpieces of the same type by the processing machine, there are few differences of a distance and an angle between each workpiece and each processing equipment (e.g. an automated robot arm), which leads to errors occurring in each operation. Further, even though the processing machine would dutifully perform the processing procedure according to the data inputted by the operator, the stereoscopic workpieces still have their own tolerances, and as a result, the errors occur.

Accordingly, manufacturers would like an apparatus capable of detecting relations between laser light spots and the tilt angles on the workpiece surfaces to be installed on the processing machine, such that the processing machine may perform the processing procedures on the workpieces more accurately. Currently, devices for determining the tilt angle on the workpiece may be implemented by various manners. A first manner is to project a laser light source on a workpiece and monitor a distance and a tilt angle between the workpiece and the processing machine according to the reflection of the laser light source. However, such reflective measurement is limited by the roughness and reflectivity of the processing surface and requires a more tilting angle for the laser light to reflect. Additionally, the reflective measurement is incapable of simultaneously measuring tilt angles of two dimensions, and therefore, more time-consuming. A second manner is to detect the distance between the processing equipment and the workpiece by using a sensing capacitor; however, such capacitive measurement is influenced by environmental factors (e.g. degrees of a temperature and humidity) and thus, requires a compensating process and is difficult to be applied to non-metal workpieces.

SUMMARY

The disclosure relates to a method and a system of detecting a tilt angle of an object surface and a method and a system of compensating the same, by which positional relationships among a plurality of light spots on the object surface are captured by using an image sensing device and accordingly calculated. The detection and compensation system are not limited to the material composition of the object, the reflectivity and flatness of the object surface and capable of simultaneously measuring tilt angles in two dimensions on the object surface.

According to an exemplary embodiment of the disclosure, a method of detecting a tilt angle of an object surface is introduced. The method includes the following steps. A plurality of light beams are projected by a light source device to an object surface, wherein a number of the light beams is greater than or equal to 3. An image of the object surface is captured so as to obtain a plurality of light spots generated on the object surface by the light beams. A vertical distance between the light source device and the object surface is adjusted to execute a focus program so as to gather the light spots in a focal point on the object surface. And, the vertical distance is adjusted, and a correction angle between the light beams and the object surface is calculated according to the light spots.

According to another exemplary embodiment of the disclosure, a system of detecting a tilt angle of an object surface is introduced. The system includes a light source device, an image capture device, an axial direction controller, an object carrying device and a computing device. The light source device projects a plurality of light beams to the object surface, wherein a number of the light beams is greater than or equal to 3. The image capture device captures an image of the object surface. The axial direction controller is coupled to the light source device and adjusts angles of the light beams of the light source device projecting to the object surface. The object carrying device adjusts a vertical distance between the light source device and the object surface. And, the computing device is coupled to the image capture device and receives the image so as to obtain a plurality of light spots generated on the object surface by the light beams. The computing device calculates a correction angle between the light source device and the object surface according to the light spots.

According to still another exemplary embodiment of the disclosure, a method of compensating a tilt angle of an object surface is introduced. The method includes the following steps. A plurality of light beams are projected by a light source device to an object surface, wherein a number of the light beams is greater than or equal to 3. An image of the object surface is captured so as to obtain a plurality of light spots generated on the object surface by the light beams. A vertical distance between the light source device and the object surface is adjusted to execute a focus program so as to gather the light spots in a focal point on the object surface. And, a correction angle and the vertical distance between the light source device and the object surface are adjusted and calculated according to the light spots.

Further, according to yet another exemplary embodiment of the disclosure, a system of compensating a tilt angle of an object surface is introduced. The system includes a light source device, an image capture device, an axial direction controller, an object carrying device and a computing device.

The light source device projects a plurality of light beams to an object surface, wherein a number of the light beams is greater than or equal to 3. The image capture device captures an image of the object surface. The axial direction controller is coupled to the light source device and adjusts angles of the light beams of the light source device projecting to the object surface. The object carrying device is configured to adjust a vertical distance between the light source device and the object surface. The computing device is coupled to the image capture device and receives the image so as to obtain a plurality of light spots generated on the object surface by the light beams. The computing device executes a focus program according to the light spots, adjusts the vertical distance through the axial direction controller so as to gather the light spots in a focal point on the object surface and calculates and adjusts a correction angle and the vertical distance between the light source device and the object surface according to the light spots.

To sum up, in the method and the system of detecting the tilt angle of the object surface as well as the method and the system of compensating the same introduced by the disclosure, a positional relationship among a the plurality of light spots is obtained by the coaxially disposed light source device and the image sensing device, and a spatial relationship (such a distance and a tilt angle) between a laser light source (or a processing equipment) and the object surface is adjusted through algorithm calculations, such that the detection device is not limited to the material composition of the object, the reflectivity and flatness of the object surface and capable of simultaneously measuring the tilt angles in two dimensions on the object surface. In addition, in the compensation method and system introduced by the exemplary embodiments of the disclosure, a processing equipment may be further installed, and the relative spatial relationship between the processing equipment and the object surface is adjusted according to the tilt angle obtained through the calculations. Accordingly, an effect and quality of processing the object may be enhanced so as to facilitate in industrial equipments which perform laser processing procedures.

In order to make the disclosure more comprehensible, several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
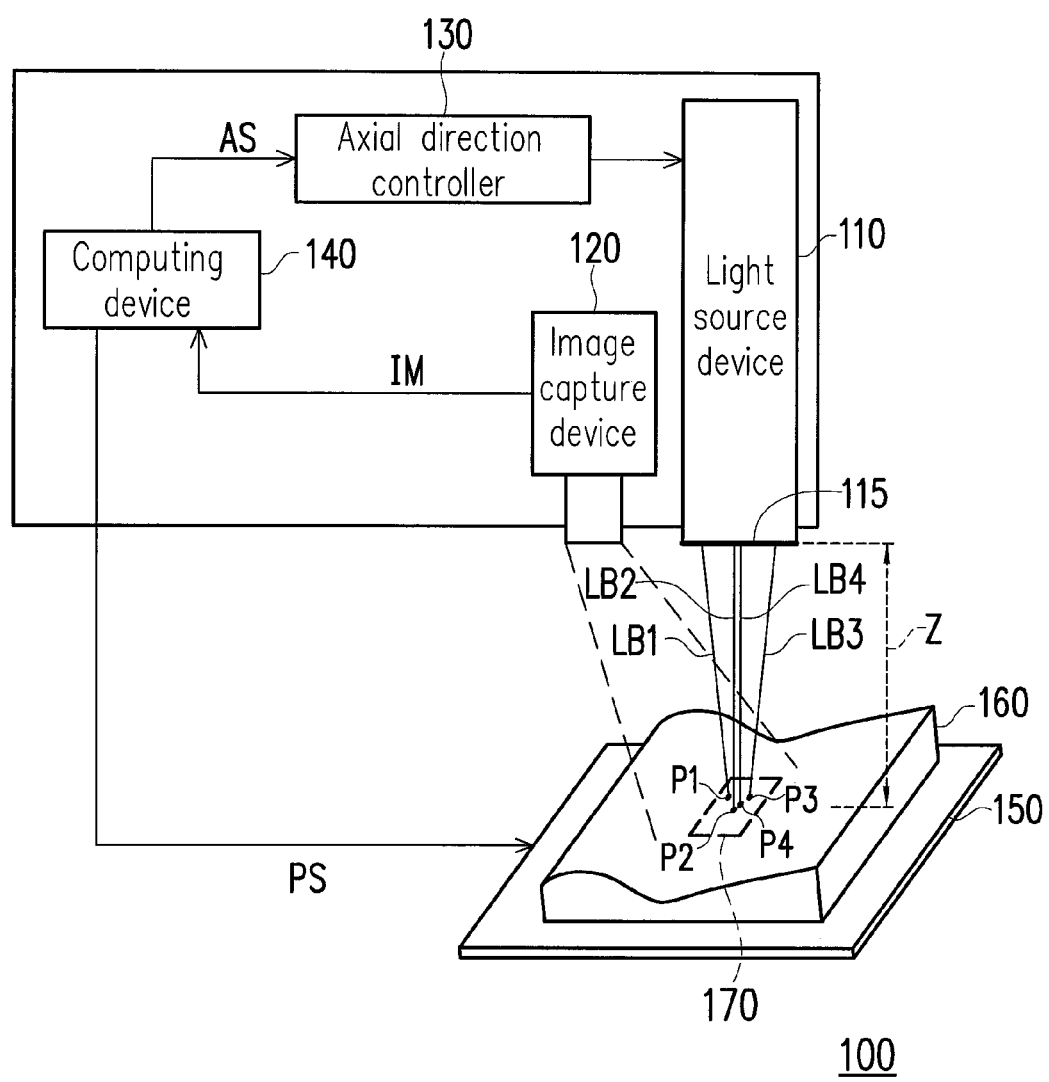
FIG. 1 is a schematic diagram illustrating a system of detecting a tilt angle of an object surface according to an exemplary embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Referring to FIG. 1, FIG. 1 is a schematic diagram illustrating a detecting system 100 of a tilt angle of an object surface 170 of an object 160 according to an exemplary embodiment of the disclosure. The detecting system 100 may be installed in processing equipment, such as a robot arm installed for laser welding and laser cutting various types of workpieces in vehicle production and is applicable to various types of equipments of producing curved-surface objects, but the disclosure is not limited thereto. The processing equipments may position a processing position by the detecting system 100 using a laser light source.

The detecting system 100 of the present exemplary embodiment includes a light source device 110, an image capture device 120, an axial direction controller 130, an object carrying device 150 and a computing device 140. The light source device 110 projects a plurality of light beams LB1~LB4 to the object surface 170 of the object 160. The object 160 may be a plane workpiece, a curved-surface workpiece or any other non-plane workpiece, such as a mold, a vehicle part, a product housing, a glass panel and so forth. The light source device 110 may be implemented by a transmitter of a laser light source with a visible light wavelength, such that the image capture device 120 may implement capturing an image IM by a camera with a generally-used resolution. Those that apply the present exemplary embodiment may also be implemented by a transmitter of a laser light source with a invisible light wavelength; however, the image capture device 120 in this case requires a camera having a corresponding specification to capture the image IM. Thus, the image IM may have a plurality of light spots P1~P4 formed on the object surface 170 by the light beams LB1~LB4. Each of the light beams LB1~LB4 of the light source device 110 has a fixed emitting angle and is configured relatively. Thus, if an light beam emitting surface 115 of the light source device 110 is separated from the object surface 170 by a specific vertical distance Z, the light spots P1~P4 generated by the light beams LB1~LB4 mat be focused on a same point, no matter whether the light beam emitting surface 115 is parallel to the object surface 170 or not.

It is to be mentioned that the detecting system 100 requires the light spots P1~P4 formed on the object surface 170 to calculate a tilt angle between the object surface 170 and the light source device 110. Thus, when a number of the light beams is 2, the detecting system 100 may detect a tilt angle on a single axial (e.g. a one-dimensional line segment) on the object surface 170. When the number of the light beams is greater than 3, the detecting system 100 may detect a tilt angle on two axes (i.e. a two-dimensional surface) on the object surface 170. Corresponding calculation methods and mechanisms of the detecting system 100 in the scenarios where the number of the light beams is 3, 4 and 5 respectively will be described in the following exemplary embodiments. Additionally, an arrangement of the light beams presents a specific geometric shape on the same horizontal plane, such that the tilt angle of the object surface may be calculated. Those apply the present exemplary embodiment may know from the exemplary embodiments illustrated by the disclosure about the related implementations in the scenarios where the number of the light beams is equal to or greater than 3. A description in related to the exemplary embodiment of four light beams LB1~LB4 and four light spots P1~P4 generated thereby will be made with reference to FIG. 1.

The image capture device 120 captures an image located adjacently to the object surface 170 so as to obtain a plurality of light spots P1~P4 on the object surface 170. In the present exemplary embodiment, the image capture device 120 is coaxially disposed with the light source device 110. Namely, the image capture device 120 is disposed at a position same as or adjacent to the light source device 110, and these two devices are simultaneously controlled by the axial direction controller 130 to rotate and move with respect to the same axial center. Thus, the image capture device 120 keeps obtaining the light spots P1~P4 generated by the light source device 110. In other exemplary embodiments, the image capture device 120 may also be independently disposed without being coaxially disposed with the light source device 110.

The axial direction controller 130 is coupled to the light source device 110 and may also be coupled to the image capture device 120 simultaneously. The axial direction controller 130 obtains an axial-direction adjustment signal AS from the computing device 140 so as to adjust angles of the light beams LB1~LB4 of the light source device 110 projecting to the object surface 170. If the image capture device 120 is coaxially disposed with the light source device 110, the axial direction controller 130 simultaneously adjusts angles and spatial positions of the image capture device 120 and the light source device 110.

The object carrying device 150 is used to carry the object 160 and obtains a position adjustment signal PS from the computing device 140 so as to adjust a vertical distance between the light source device 110 and the object surface 170. In the present exemplary embodiment, the light source device 110 is disposed vertically on the object 160 so as to project the light beams LB1~LB4 and accurately measure a tilt angle of the object surface 170 relative to the light source device 110. The object carrying device 150 may be a carrier of the processing equipment and may perform operations, such as vertical uplift, vertical descent, rotation with an angle, horizontal movement and so forth, on the object 160 so as to finely adjust the computing device 140 during object positioning or processing.

The computing device 140 is coupled to the image capture device 120, the axial direction controller 130 and the object carrying device 150. The computing device 140 receives the captured image IM by the image capture device 120 and resolves the image IM through an image algorithm so as to obtain the light spots P1~P4 generated on the object surface 170 by the light beams LB1~LB4 therefrom. Accordingly, the computing device 140 may calculate a correction angle to be finely adjusted between the light source device 110 and the object surface 170 according to the light spots P1~P4. Thus, the detecting system 100 of the disclosure detects the plurality of light spots P1~P4 on the object surface 170 by the image capture device 120 and adjust an error of laser positioning by the computing device 140 using a corresponding calculation mechanism, without being limited to the material, surface reflectivity and flatness adopted by the object 160. Positions of the light spots P1~P4 detected by the image capture device 120 are in a two-dimensional distribution, and thus, a tilt angle in two dimensions may be simultaneously measured. For example, a tilt angle on the X axis and the Y axis on the object surface 170 may be simultaneously measured.

In the exemplary embodiments of the disclosure, the computing device 140 of the detecting system 100 may further execute a focus program according to the positions of the light spots P1~P4, by which a vertical distance Z between the light source device 110 and the object surface 170 is adjusted through the axial direction controller 130 so that the light spots P1~P4 of the object surface 170 may be focused on the focal point for accurate laser positioning. The computing device 140 of the present exemplary embodiment determines whether the light spots P1~P4 coincide in the focal point through the image IM. When the light spots do not coincide in the focal point, the computing device 140 repeatedly adjusts the vertical distance Z and calculates an interval between each of the light spots, such that the light spots P1~P4 coincide in the focal point. The description in connection with the enabling method and process of the focus program will be made with reference to FIG. 2.

Figure 2:
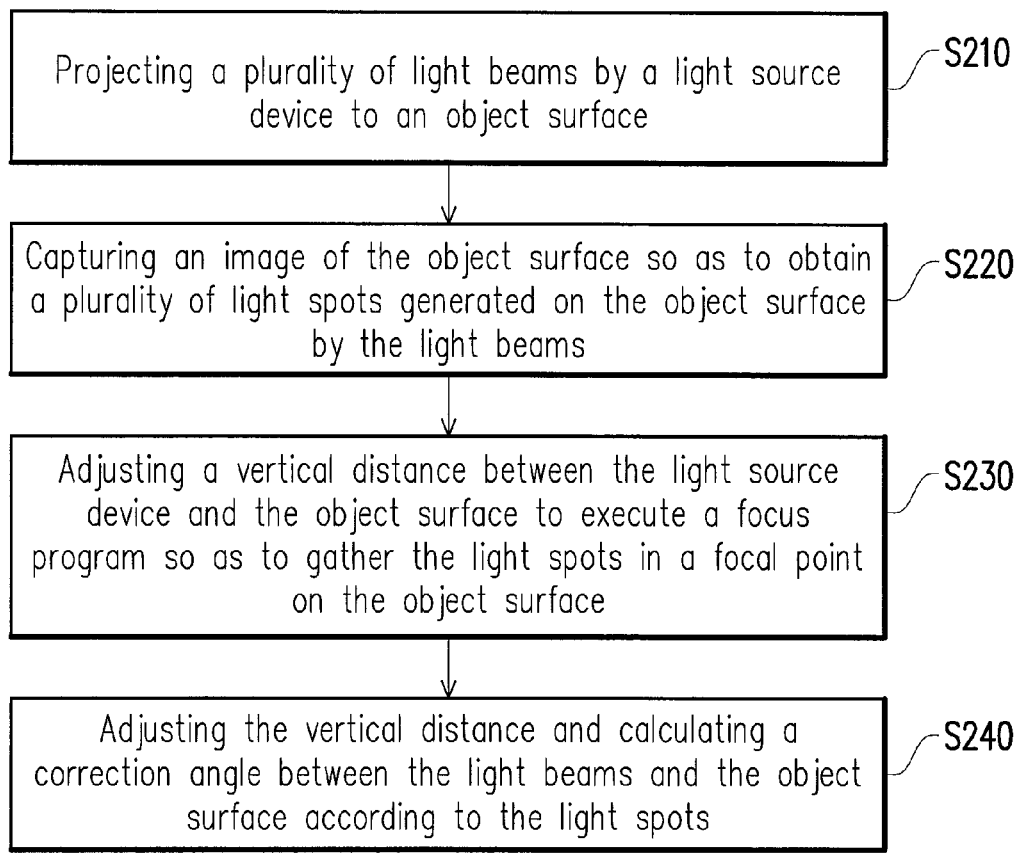
FIG. 2 is a flowchart illustrating a method of detecting a tilt angle of an object surface according to an exemplary embodiment of the disclosure.

FIG. 2 is a flowchart illustrating a method of detecting a tilt angle of an object surface according to an exemplary embodiment of the disclosure, which is implemented by adopting the detecting system 100 depicted in FIG. 1. Referring to FIG. 2 with FIG. 1, in step S210, the detecting system 100 projects a plurality of light beams (e.g. the light beams LB1~LB4 depicted in FIG. 1) to the object surface 170 by the light source device 110. In the present exemplary embodiment, the number of the light beams may be greater than or equal to 3. When the number of the light beams is 2, the detecting system 100 may detect a tilt angle on a single axial (e.g. a one-dimensional line segment) on the object surface 170. When the number of the light beams is greater than 3, the detecting system 100 may detect a tilt angle on two axes (i.e. a two-dimensional surface) on the object surface 170. In step S220, the computing device 140 captures an image IM of the object surface 170 by the image capture device 120 and resolves the image IM so as to obtain light spots P1~P4 generated on the object surface 170 generated by the light beams LB1~LB4.

In step S230, the computing device 140 utilizes the object carrying device 150 to adjust the vertical distance Z between the light source device 110 and the object surface so as to execute the focus program. As such, the light spots P1~P4 on the object surface 170 are gathered in the focal point. After executing the focus program, it represents that the light beam emitting surface 115 of the light source device 110 is apart from the object surface 170 by the specific vertical distance Z, and thus, the light beam emitting surface 115 is different from the object surface 170 by only the tilt angle. Accordingly, in step S240, the computing device 140 adjusts the vertical distance Z by the object carrying device 150, obtains the two-dimensional distribution of the positions of the light spots P1~P4 on the object surface 170 by the image capture device 120 and calculates the correction angle between the light beams LB1~LB4 (i.e. the light beam emitting surface 115) and the object surface 170 according to the positions of the light spots. In brief, when executing the focus program, whether the light spots coincide in the focal point is determined first. When the light spots do not coincide in the focal point, the light spots are coincided in the focal point by adjusting the vertical distance and calculating the interval between each of the light spots.

Figure 3:
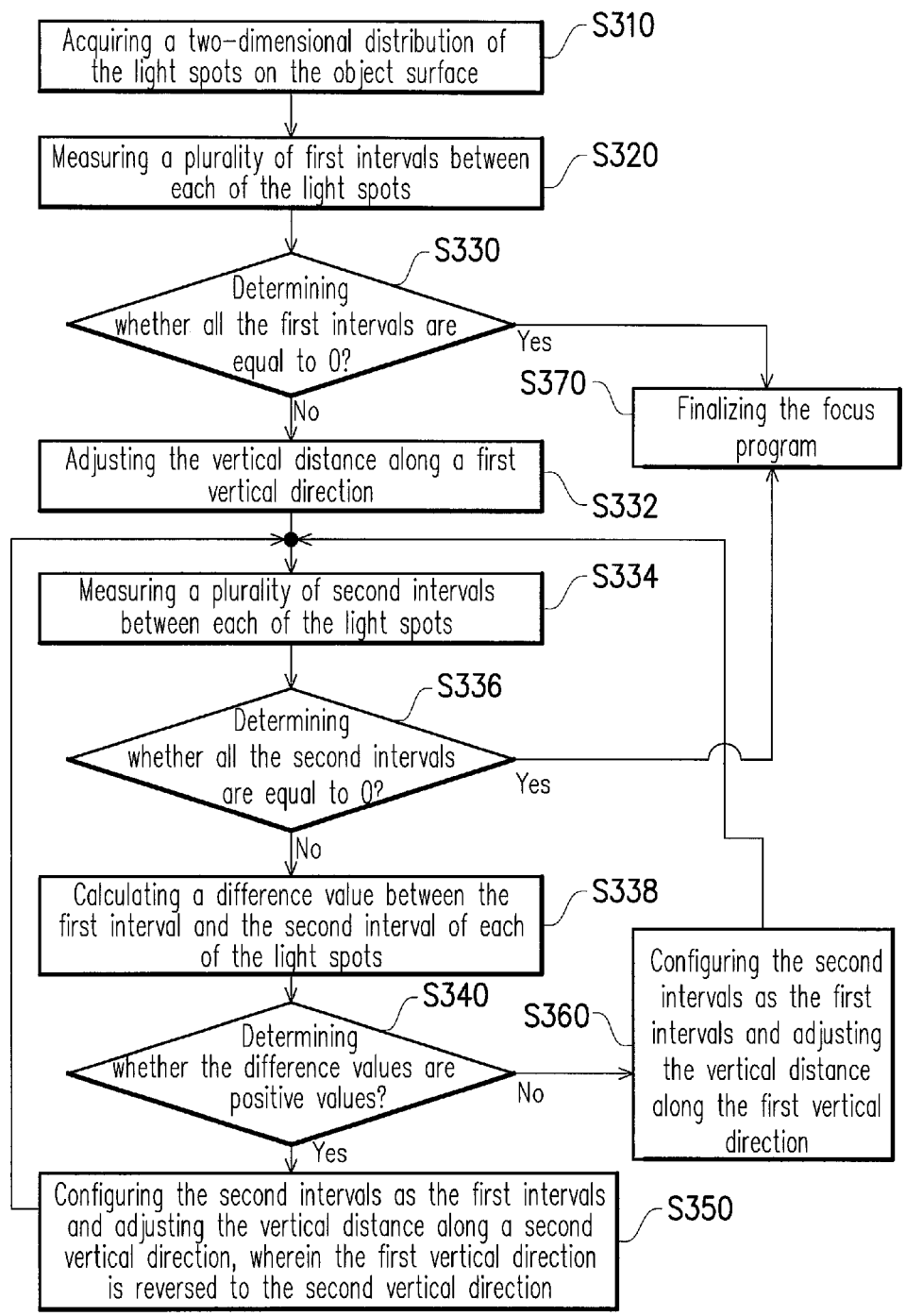
FIG. 3 is a detailed flowchart of step S230 depicted in FIG. 2.
Figure 4A:
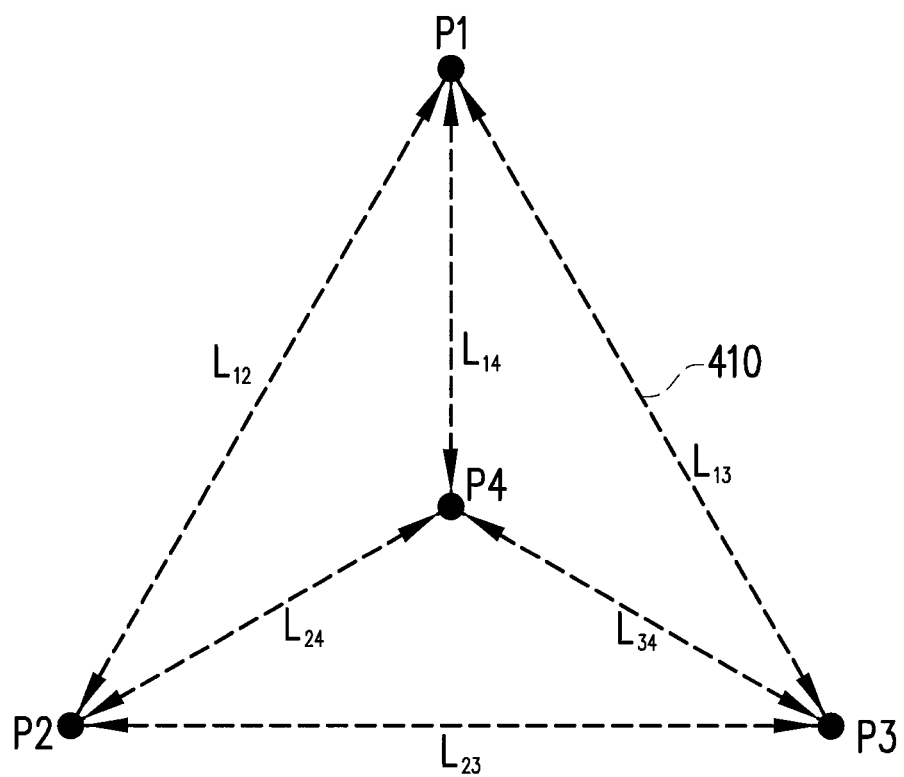
FIGS. 4A and 4B are schematic diagrams illustrating an arrangement of each of the light spots when a number of the light beams is 4.
Figure 4B:
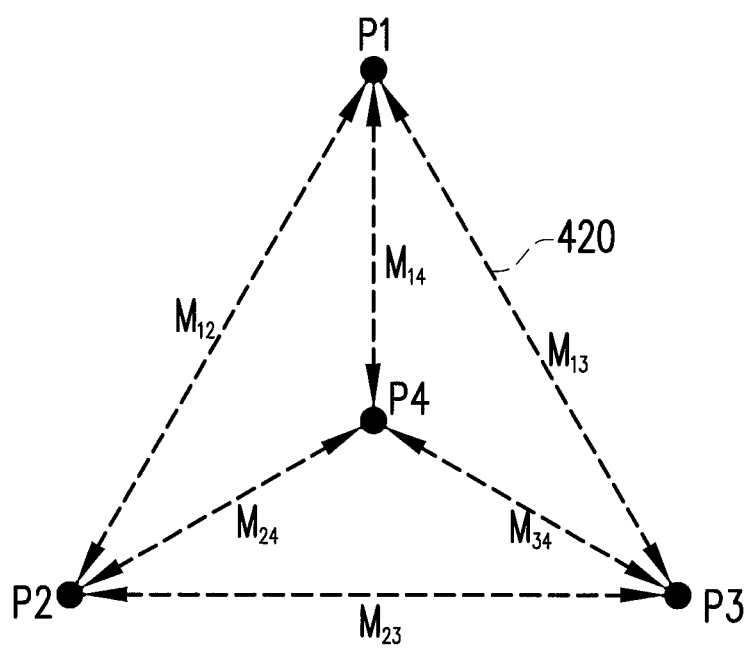

Herein, the focus program executed by the computing device 140, i.e. step S230 depicted in FIG. 2 will be described in detail. FIG. 3 is a detailed flowchart of step S230 depicted in FIG. 2. FIGS. 4A and 4B are schematic diagrams illustrating an arrangement of each of the light spots when a number of the light beams is 4. When the number of the light beams is equal to 4, an arrangement of the first through the third light spots P1~P3 generated by the light beams LB1~LB3 presents an equilateral triangle 410 or 420 on the same surface, as shown in FIGS. 4A and 4B of the disclosure. The fourth light spot P4 generated by the light beam LB4 is arranged in a gravity center position of the equilateral triangle 410 or 420. Referring to FIGS. 4A and 4B with FIG. 1 and FIG. 2. In step S310, the computing device 140 captures the image IM by the image capture device 120 so as to acquire a two-dimensional distribution of the light spots P1~P4 on the object surface 170 (FIG. 4A). In step S320, the computing device 140 measures a plurality of first intervals between each of the light spots by using the two-dimensional distribution. For example, the computing device 140 may measure a first interval $L_{12}$ between the light spots P1 and P2, a first interval $L_{23}$ between the light spots P2 and P3, a first interval $L_{13}$ between the light spots P1 and P3 and first intervals $L_{14}$, $L_{24}$ and $L_{34}$ between the light spot P4 and each of the light spots P1~P3 by the light spots P1~P4 presented in FIG. 4A.

In step S330, the computing device 140 determines whether all the first intervals (i.e. the intervals $L_{12}$, $L_{13}$, $L_{14}$, $L_{24}$ and $L_{34}$) are equal to 0. When all the first intervals are 0, the light spots are determined as coinciding in the focal point, which represents that the light spots P1~P4 are focused on the same point. Accordingly, step S370 is entered to finalize the focus program. Otherwise, when none of the first intervals is 0, step S332 is entered, where the computing device 140 controls the object carrying device 150 to adjust the vertical distance Z along a first vertical direction. For example, the object surface 170 may be uplifted to shorten the vertical distance Z. The first vertical direction is from the object 160 facing toward the light source device 110.

In step S334, the computing device 140 acquire again the two-dimensional distribution illustrated in FIG. 4B by using the image capture device 120 to measure a plurality of second intervals between each of the light spots P1~P4. For example, the computing device 140 may measure a plurality of second intervals $M_{12}$, $M_{23}$, $M_{13}$, $M_{14}$, $M_{24}$ and $M_{34}$ by using the light spots P1~P4 presented in FIG. 4B.

In step S336, if all the second intervals are equal to 0, it represents that the light spots P1~P4 are focused on the same point, and thus, step S370 is entered to finalize the focus program. Otherwise, when all the second intervals are not equal to 0, step S338 is entered, and the computing device 140 calculates a difference between each of the first intervals ($L_{12}$, $L_{13}$, $L_{14}$, $L_{24}$ and $L_{34}$) and each of the corresponding second intervals ($M_{12}$, $M_{23}$, $M_{13}$, $M_{14}$, $M_{24}$ and $M_{34}$).

In step S340, the computing device 140 determines whether the differences are positive values. When the differences are positive values, it represents that the interval between each of the light spots is gradually enlarged. Namely, the height of the object 160 is required to decrease to elongate the vertical distance Z, such that each of the light spots would approach to each other for being focused. Accordingly, step S350 is entered, and the computing device 140 configures each of the second intervals as each of the corresponding first intervals. For example, the second interval $M_{12}$ is configured as the first interval $L_{12}$, and the vertical distance Z is adjusted along a second vertical direction reversed to the first vertical direction, for example, by decreasing the height of the object 160 to elongate the vertical distance Z. Then, step S334 is entered from step 350, and the second interval between each of the light spots is measured. Then, steps S334~S340 are repeated to adjust the vertical distance Z, such that the light spots P1~P4 are gathered in the same focal point. On the other hand, in step S340, when the computing device 140 determines that the differences are negative values, it represents that the interval between each of the light spots is gradually decreased. Namely, the adjustment of the vertical distance Z along the first vertical direction is correct, but should be continued. Thus, step S360 is entered, and the computing device 140 configures each of the second intervals as each of the corresponding first intervals and continues to adjust the vertical distance Z along the first vertical direction. Then, step S334 is entered from step S360, where the second interval between each of the light spots is measured and steps S334~S340 is repeated to finalize the focus program.

Figure 5:
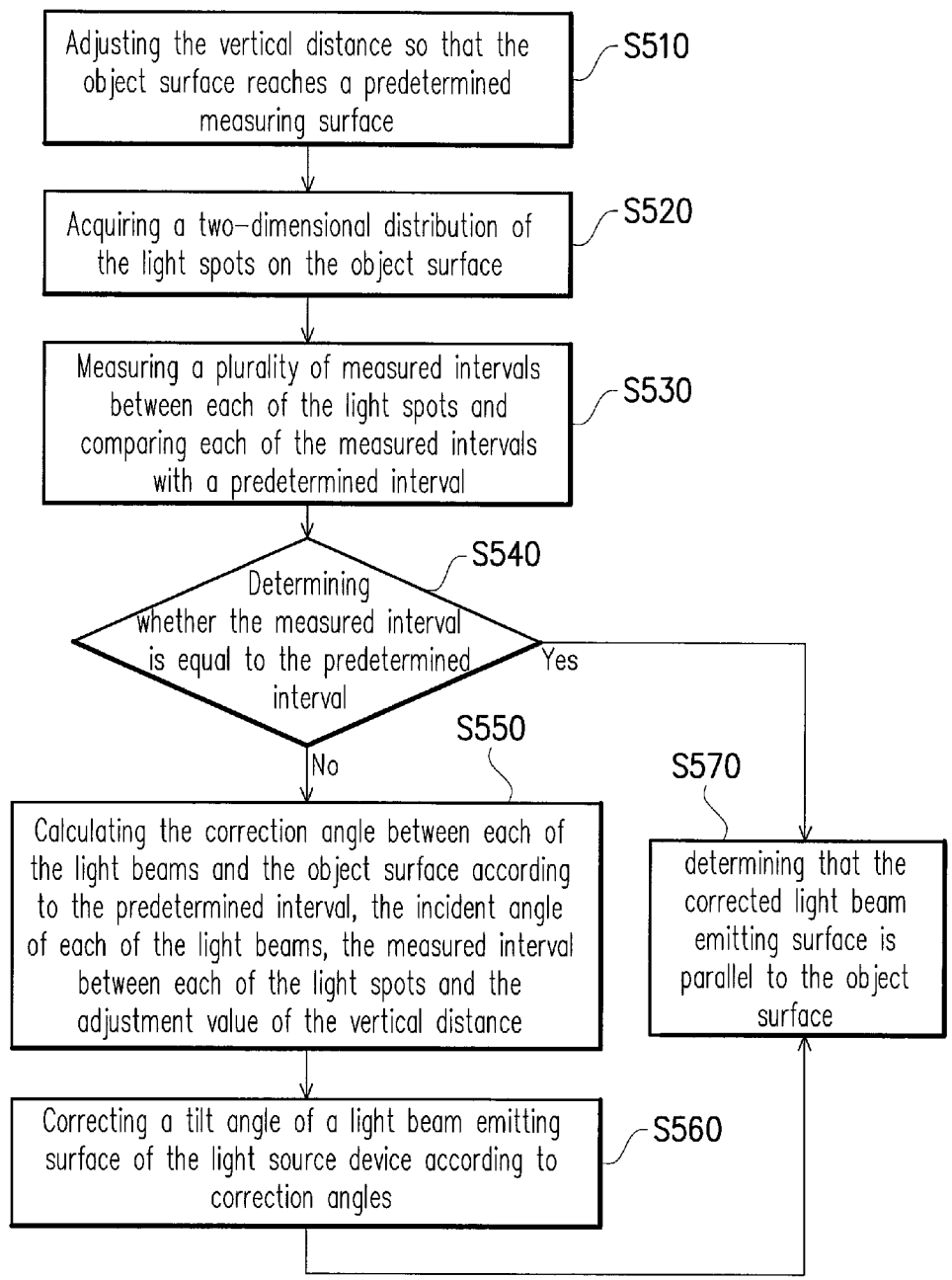
FIG. 5 is a detailed flowchart of step S240 depicted in FIG. 2.
Figure 6:
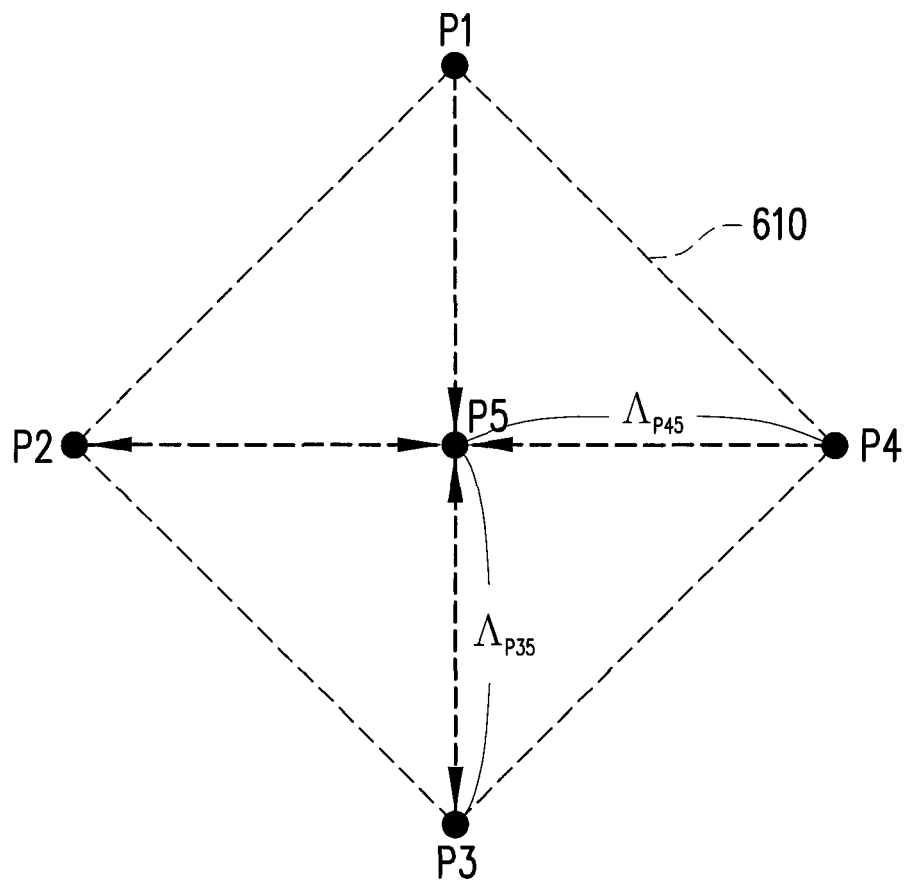
FIG. 6 is a schematic diagram illustrating an arrangement of each of the light spots when the number of the light beams is 5.
Figure 7:
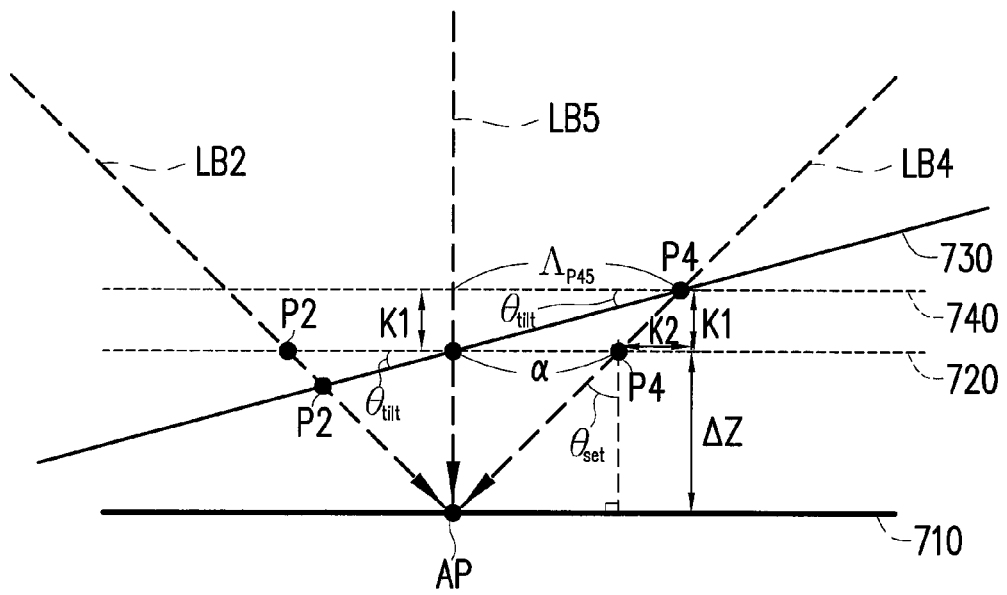
FIG. 7 is a schematic diagram illustrating the object surface on the connection of the light spots P2, P5 and P4 to calculate the tilt angle when the number of the light beams is 5.

Herein, how the detecting system 100 calculates the correction angle between the light beams and the object surface 170 according to the light spots will be described, and namely, step S240 depicted in FIG. 2 will be described. FIG. 5 is a detailed flowchart of step S240 depicted in FIG. 2. In the present exemplary embodiment, an arrangement composed of 5 light beams illustrated in FIG. 6 will be described, where FIG. 6 is a schematic diagram illustrating an arrangement of each of the light spots when the number of the light beams is 5. When the number of the light beams is equal to 5, an arrangement of a first light spot P1 through a fourth light spot P4 generated by the light beams presents an equilateral rhombus 610 on the same surface. A fifth light spot P5 is arranged in the gravity center position of the equilateral rhombus 610. A connection of the light spots P2, P5 and P4 may be considered as the first dimension (e.g. the X axis), while a connection of the light spots P1, P5 and P3 may be the second dimension (e.g. the Y axis). FIG. 7 is a schematic diagram illustrating the object surface on the connection of the light spots P2, P5 and P4 to calculate the tilt angle when the number of the light beams is 5. FIG. 7 is a schematic diagram illustrating the object surface on the connection of the light spots P2, P5 and P4 to calculate the tilt angle when the number of the light beams is 5, where the point AP is the focal point of the light beams.

Referring to FIG. 5, FIG. 6 and FIG. 7 simultaneously, when the number of the light beams is 5, and step S230 depicted in FIG. 2 is finalized, all the light beams LB1~LB5 are focused in the focal point AP, which represents that a position where the object surface 170 is located is actually a processing surface 710 (FIG. 7). However, in the present exemplary embodiment, the tilt angle of the object surface 170 relative to the light beam emitting surface 115 is not calculated yet. Thus, in step S510, the computing device 140 adjusts the vertical distance Z by the object carrying device 150. For example, the object surface 170 is uplifted for an adjustment value ΔZ of the vertical distance Z so that the object surface 170 reaches a predetermined measuring surface 720. In an optimal situation where the light beam emitting surface 115 is parallel to the object surface 170, the object surface 170 is supposed to reach the predetermined measuring surface 720. The light beam emitting surface 115 is parallel to the predetermined measuring surface 720. However, the object surface 170 may be actually uplifted to the measuring surface 730 due to error.

In step S520 depicted in FIG. 5, the computing device 140 acquires a two-dimensional distribution of each of the light spots P1~P5 by the image capture device 120. In step S530, the computing device 140 measures a measured interval Λ between each of the light spots P1~P5 according to the light spots P1~P5 and the adjustment value ΔZ for uplifting the vertical distance Z and compares each of the measured intervals Λ with a predetermined interval α. In detail, when the number of the light beams is 5, the predetermined interval α represents an expected distance from one of the first light spot P1 through the fourth light spot P4 to the fifth light spot P5. The predetermined interval α may be decided through the predetermined adjustment value ΔZ and an incident angle $\theta_{set}$ of each of the light beams. In other words, the predetermined interval α may be obtained from the following formula (1):

$$\tan(\theta_{set}) = \frac{\alpha}{\Delta Z} \Rightarrow \alpha = \tan(\theta_{set}) \times \Delta Z \quad (1)$$

Therein, the predetermined interval α is a tangent function value of the adjustment value ΔZ of the vertical distance Z being multiplied by the incident angle of each of the light beams.

Each of the measured intervals Λ is an actually measured distance from one of the first P1 through the fourth light spot P4 to the fifth light spot P5 obtained by the computing device 140 through the image IM. Referring to FIG. 6 and FIG. 7, a measured interval $\Lambda_{P45}$ is a measured distance from the fourth light spot P4 to the fifth light spot P5, and a measured interval $\Lambda_{P35}$ is a measured distance from the third light spot P3 to the fifth light spot P5.

However, it is to be noticed that since the image capture device 120 captures the image IM from top to bottom in FIG. 7, by the obtained measured interval $\Lambda_{P45}$, only an actual distance from the light spot P4 to the light beam LB5 on a virtual 740 parallel to the predetermined measuring surface 720 may be measured.

Then in step S540 of FIG. 5, the computing device 140 determines whether the measured interval $\Lambda_{P45}$ is equal to the predetermined interval α. When the computing device 140 determines that the measured interval $\Lambda_{P45}$ is equal to the predetermined interval α, it represents that the object surface 170 is located above the predetermined measuring surface 720, and step S570 is entered from step S540, and the computing device 140 does not need to calculate the correction angle of the light beams and determines that the light beam emitting surface 115 is parallel to the object surface 170.

Otherwise, when the computing device 140 determines that that the measured interval $\Lambda_{P45}$ is not equal to the predetermined interval α, it represents that the object surface 170 is not located above the predetermined measuring surface 720, but uplifted to the actual measuring surface 730. Thus, in the present exemplary embodiment, step S550 is performed according the following algorithm, where the correction angle, such as a correction angle $\theta_{tilt}^X$ of the first dimension (the X axis) and a correction angle $\theta_{tilt}^Y$ of the second dimension (the Y axis), between the light beam emitting surface 115 and the object surface 170 is calculated according to the predetermined interval α, the incident angle $\theta_{set}$ of each of the light beams, the measured interval $\Lambda_{P45}$ between the light spots P4 and P5 and the adjustment value ΔZ of the vertical distance Z.

When the number of the light beams is 5, and the incident angle $\theta_{set}$ of the light beam LB4 projecting to the focal point AP is 45 degrees, as shown in FIG. 6 and FIG. 7, a line segment K1 vertical to the actual processing surface 710 has the same length as a line segment K2 horizontal with the actual processing surface 710.

The correction angle $\theta_{tilt}^X$ may be obtained by the following formulas (2) and (3):

$$\tan(\theta_{tilt}^X) = \frac{K1}{\Lambda_{P45}} = \frac{K1}{K2 + \alpha} = \frac{\Lambda_{P45} - \alpha}{\Lambda_{P45}} \quad (2)$$

$$\theta_{tilt}^X = \tan^{-1}\left(\frac{K1}{\Lambda_{P45}}\right) = \tan^{-1}\left(\frac{K1}{K1 + \alpha}\right) = \tan^{-1}\left(\frac{\Lambda_{P45} - \alpha}{\Lambda_{P45}}\right) \quad (3)$$

Namely, when the incident angle $\theta_{set}$ of the light beam LB4 is 45 degrees, the correction angle $\theta_{tilt}^X$ of the first dimension (the X axis) is a arctangent function value of the measured interval $\Lambda_{P45}$ minus the predetermined interval α being divided by the measured interval $\Lambda_{P45}$. The line segment K2 is a value of the measured interval $\Lambda_{P45}$ minus the predetermined interval α, i.e. K2=$\Lambda_{P45}$−α. A relationship formula between the predetermined interval α, the incident angle $\theta_{set}$ of the light beam and the adjustment value ΔZ of the vertical distance Z may be acquired by the formula (1) in the above.

The formula (3) may be rewritten as the following formula (4) according to the formula (1):

$$\theta_{tilt}^X = \tan^{-1}\left(\frac{\Lambda - \alpha}{\Lambda}\right) = \tan^{-1}\left\{\frac{\{\Lambda - [\tan(\theta_{set}) \times \Delta Z]\}}{\Lambda}\right\} \quad (4)$$

That is, the correction angle $\theta_{tilt}^X$ of the first dimension is an arctangent function value of the measured interval $\Lambda_{P45}$ minus the tangent function value of the incident angle $\theta_{set}$ of the light beam being multiplied by the adjustment value ΔZ of the vertical distance Z and then being divided by the measured interval $\Lambda_{P45}$.

Additionally, since in the present exemplary embodiment, each of the actual measured intervals between each of the light spots P1~P5 may be obtained, the computing device 140 depicted in FIG. 1 may calculate the correction angle $\theta_{tilt}^X$ of the first dimension (the X axis) according to the connection of the light spots P2, P5 and P4, while the correction angle $\theta_{tilt}^Y$ of the second dimension (the Y axis) may be calculated according to the connection of the light spots P1, P5 and P3.

In detail, the correction angle $\theta_{tilt}^X$ of the first dimension and the correction angle $\theta_{tilt}^Y$ of the second dimension is obtained by the following formulas (5) and (6):

$$\theta_{tilt}^X = \tan^{-1}\left\{\frac{\{\Lambda_{P45} - [\tan(\theta_{set}) \times \Delta z]\}}{\Lambda_{P45}}\right\} \quad (5)$$

$$\theta_{tilt}^Y = \tan^{-1}\left\{\frac{\{\Lambda_{P35} - [\tan(\theta_{set}) \times \Delta z]\}}{\Lambda_{P35}}\right\} \quad (6)$$

In the exemplary embodiment described in the above, the incident angle $\theta_{set}$ of the light beam LB4 is set as 45 degrees. However, if the incident angle $\theta_{set}$ of the light beam LB4 projecting to the focal point AP is not predetermined 45 degrees, the vertical line segment K1 illustrated in FIG. 7 is calculated by the following formula (7):

$$\cot(\theta_{set}) = \frac{K1}{K2} = \frac{K1}{\Lambda_{P45} - \alpha} \Rightarrow K1 = (\Lambda_{P45} - \alpha) \times \cot(\theta_{set}) \quad (7)$$

The formula (3) for calculating the correction angle $\theta_{tilt}^X$ of the first dimension is rewritten as the following formula (8) according to the formulas (1) and (7):

$$\theta_{tilt}^{X} = \tan^{-1}\left(\frac{K1}{\Lambda_{P45}}\right) \quad (8)$$
$$= \tan^{-1}\left(\frac{(\Lambda_{P45} - \alpha) \times \cot(\theta_{set})}{\Lambda_{P45}}\right)$$
$$= \tan^{-1}\left(\frac{\{\Lambda_{P45} - [\tan(\theta_{set}) \times \Delta z]\} \times \cot(\theta_{set})}{\Lambda_{P45}}\right)$$

The correction angle $\theta_{tilt}^{Y}$ of the second dimension may be obtained by the following formula (9):

$$\theta_{tilt}^{Y} = \tan^{-1}\left(\frac{K1}{\Lambda_{P35}}\right) \quad (9)$$
$$= \tan^{-1}\left(\frac{(\Lambda_{P35} - \alpha) \times \cot(\theta_{set})}{\Lambda_{P35}}\right)$$
$$= \tan^{-1}\left(\frac{\{\Lambda_{P35} - [\tan(\theta_{set}) \times \Delta z]\} \times \cot(\theta_{set})}{\Lambda_{P35}}\right)$$

Namely, the correction angle $\theta_{tilt}^{X}$ of the first dimension is an arctangent function value of the measured interval $\Lambda_{P45}$ minus the tangent function value of the incident angle $\theta_{set}$ of the light beam of the first dimension being multiplied by the adjustment value $\Delta Z$ of the vertical distance Z, then being multiplied by the cotangent function value of the incident angle $\theta_{set}$ and being divided by the measured interval $\Lambda_{P45}$. If the incident angle $\theta_{set}$ is 45 degrees, the cotangent function value of the incident angle $\theta_{set}$ is 1 so as to conform to the formula (4).

In FIG. 5, step S560 is entered after step S550, the computing device 140 depicted in FIG. 1 may control the axial direction controller 130 according to the correction angles $\theta_{tilt}^{X}$ and $\theta_{tilt}^{Y}$ in the first and the second dimensions so as to correct and compensate the tilt angle of the light beam emitting surface 115 of the light source device 110, and step S570 is entered to determine that the corrected light beam emitting surface 115 is parallel to the object surface 170.

Figure 8:
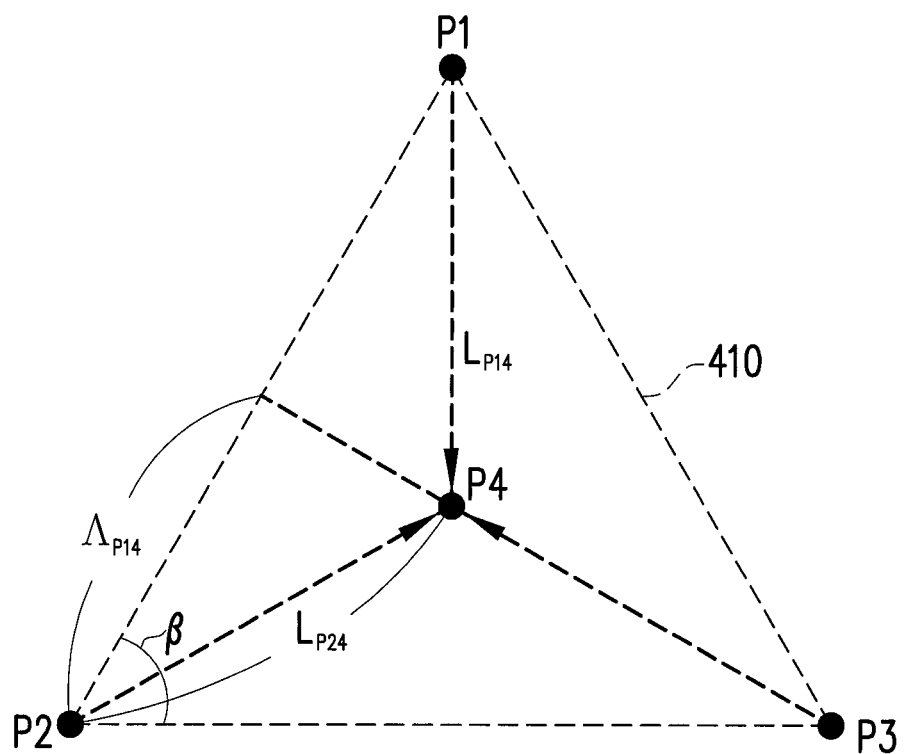
FIG. 8 is a schematic diagram illustrating an arrangement of each of the light spots when the number of the light beams is 4.
Figure 9:
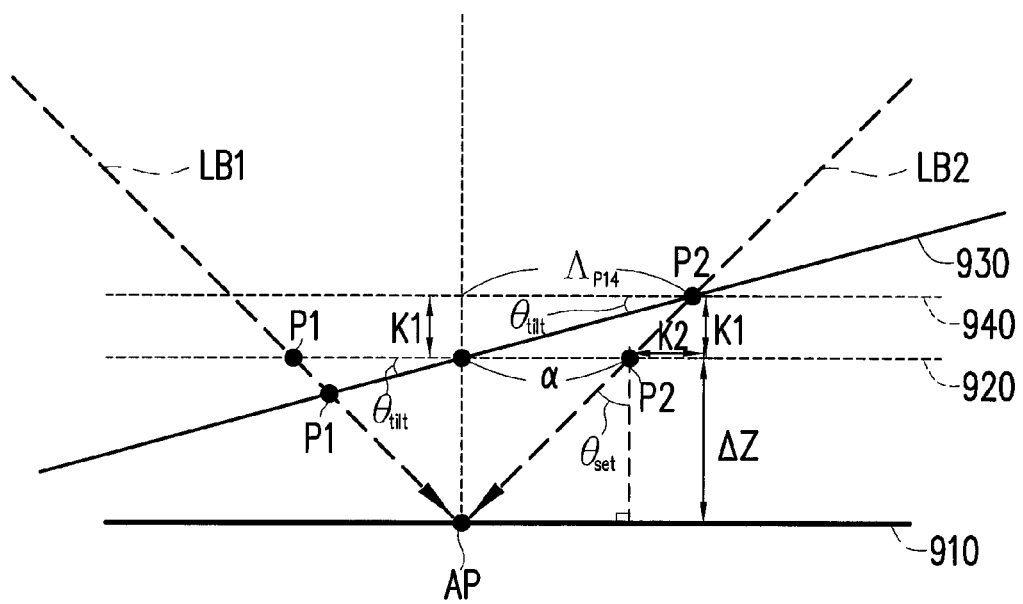
FIG. 9 is a schematic diagram illustrating the object surface on the connection of light spots P1 and P2 to calculate the tilt angle when the number of the light beams is 4.

The foregoing embodiment is implemented according to the condition where the number of the light beams is 5 and the algorithm formulas in step S550. Hereinafter, exemplary embodiments implemented according to the conditions where the number of the light beams is respectively 4 and 3 will be described. FIG. 8 is a schematic diagram illustrating an arrangement of each of the light spots when the number of the light beams is 4. FIG. 9 is a schematic diagram illustrating the object surface on a connection of light spots P1 and P2 to calculate the tilt angle when the number of the light beams is 4. FIG. 9 is a schematic diagram illustrating the object surface on the connection of light spots P1 and P2 to calculate the tilt angle when the number of the light beams is 4. The triangle shape and the arrangement of the light spots illustrated in FIG. 8 are similar to FIGS. 4A and 4B, which will not be repeated hereinafter.

FIG. 9 is similar to FIG. 7, and the difference therebetween lies in that FIG. 9 illustrates a connection between the light spots P1~P2 depicted in FIG. 8. Here, the predetermined interval $\alpha$ of the present exemplary embodiment is a half of each expected side length (e.g. a side length between the light spots P1~P2) in the equilateral triangle 410 depicted in FIG. 8. The measured interval $\Lambda$ is a half of a measured side length between two light spots among the first light spot P1 through the third light spot P3. For example, the measured interval $\Lambda_{P14}$ is a half of the measured side length between the light spots P1~P2. Only an actual distance from the light spot P2 to a central line segment on a virtual surface parallel to the predetermined measuring surface 920 may measured according to the obtained measured interval $\Lambda_{P12}$. Each corner of the equilateral triangle 410 has a predetermined angle $\beta$.

Thus, referring to both FIG. 8 and FIG. 9, the predetermined interval $\alpha$ may be acquired by formula (10):

$$\tan(\theta_{set}) = \frac{\alpha}{\Delta Z} \Rightarrow \alpha = \tan(\theta_{set}) \times \Delta Z \quad (10)$$

The measured interval $\Lambda_{P14}$ may be obtained according to a distance $L_{P24}$ between the light spots P2 and P4 and the predetermined angle $\beta$ of the triangle formed by the light spots P1~P3, as shown in the following formula (11):

$$\Lambda_{P14} = L_{P24} \times \cos(\beta/2) \quad (11)$$

Namely, the measured interval $\Lambda_{P14}$ is a value obtained by multiplying the distance between the second light spot P2 and the fourth light spot P4 on the surface formed by the connection of the light spots P1~P2 by a cosine function value of a half of the predetermined angle $\beta$.

The correction angle $\theta_{tilt}$ on a connection of the first light spot P1 through the second light spot P2 may be acquired by calculating an adjusted formula (12) according to the formula (8):

$$\theta_{tilt} = \tan^{-1}\left\{\frac{\{\Lambda_{P14} - [\tan(\theta_{set}) \times \Delta Z]\} \times \cot(\theta_{set})}{\Lambda_{P14}}\right\} \quad (12)$$
$$= \tan^{-1}\left\{\frac{\{L_{P24} \times \cos(\beta/2) - [\tan(\theta_{set}) \times \Delta Z]\} \times \cot(\theta_{set})}{L_{P24} \times \cos(\beta/2)}\right\}$$

Therein, $\theta_{tilt}$ is the correction angle on the connection of the first light spot P1 through the second light spot P2, $L_{P24}$ is the distance between the second light spot P2 and the fourth light spot P4, $\beta$ is the predetermined angle of each corner of the equilateral triangle 410, $\theta_{set}$ is the incident angle of each of the light beams LB1 and LB2 respectively corresponding to the first light spot P1 and the second light spot P2, and $\Delta Z$ is the adjustment value of the vertical distance Z. In other words, the correction angle $\theta_{tilt}$ located on the connection of the first light spot P1 through the second light spot P2 is an arctangent function value of the measured interval $\Lambda_{P14}$ minus the tangent function value of the incident angle $\theta_{set}$ of each of the light beams LB1 and LB2 corresponding to the first light spot P1 and the second light spot P2, which is multiplied by the adjustment value $\Delta Z$ of the vertical distance Z and then multiplied by the cotangent function value of the incident angle $\theta_{set}$, and divided by the measured interval $\Lambda_{P14}$. If the incident angle $\theta_{set}$ of each of the light beam is set as 45 degrees, the cotangent function value of the incident angle $\theta_{set}$ is 1.

Figure 10:
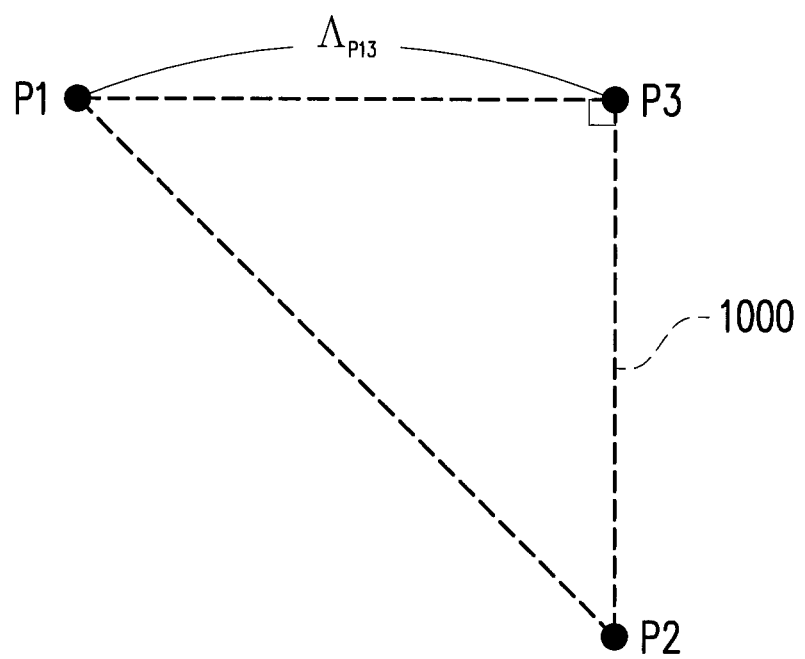
FIG. 10 is a schematic diagram illustrating an arrangement of each of the light spots when the number of the light beams is 3.

FIG. 10 is a schematic diagram illustrating an arrangement of each of the light spots when the number of the light beams is 3. When the number of the light beams is 3, an arrangement of the three light spots P1~P3 generated by light beams presents a vertical isosceles triangle 1000 on the same surface. The first light spot P1 and the second light spot P2 are two are respectively located at two acute vertices of the vertical isosceles triangle, and the third light spot P3 is located at the endpoint of the vertical isosceles triangle 1000.

Here, the predetermined interval $\alpha$ of the present exemplary embodiment is an expected distance between one of the first light spot P1 through the second light spot P2 to the third light spot P3. Each measured interval $\Lambda$ is a measured distance from one of the first light spot P1 and the second light spot P2 to the third light spot P3. For example, the measured interval $\Lambda_{P13}$ is the measured distance between the light spots P1 and P3.

Accordingly, a connection between the first light spot P1 and the third light spot P3 may be considered as the first dimension (the X axis), and the connection between the second light spot P2 and the third light spot P3 may be considered as the second dimension (the Y axis). Thus, the correction angle $\theta_{tilt}^X$ of the first dimension and the correction angle $\theta_{tilt}^Y$ of the second dimension are respectively obtained by the following formulas (13) and (14):

$$\theta_{tilt}^X = \tan^{-1}\left\{\frac{\{\Lambda_{P13} - [\tan(\theta_{set}) \times \Delta z]\}}{\Lambda_{P13}}\right\} \quad (13)$$

$$\theta_{tilt}^Y = \tan^{-1}\left\{\frac{\{\Lambda_{P23} - [\tan(\theta_{set}) \times \Delta z]\}}{\Lambda_{P23}}\right\} \quad (14)$$

Namely, the correction angle $\theta_{tilt}^X$ located on the connection between the first light spot P1 through the third light spot P3 is an arctangent function value of the measured interval $\Lambda_{P13}$ minus the tangent function value of the incident angle of the light beam corresponding to the first light spot P1, which is multiplied by the adjustment value $\Delta Z$ of the vertical distance Z, and divided by the measured interval $\Lambda_{P13}$. Other detailed of the present exemplary embodiment may refer to the foregoing exemplary embodiments, and will not be repeated hereinafter.

In the present exemplary embodiment, the detecting system 100 depicted in FIG. 1 may be installed in a processing apparatus. Thus, the detecting system 100 may further include a processing equipment. The processing equipment is coupled to the computing device 140, such that the computing device 140 calculates the correction angle according to the light spots to correct the relative positional relationship between the processing equipment and the object surface 170 so as to mitigate errors that might occur in processing procedures. In the present exemplary embodiment, the computing device 140 of the detecting system 100 may not only calculate the correction angle between the light source device and the object surface but also adjust the correction angle and the vertical distance between the light source device 110 and the object surface 170 by the axial direction controller 130 and the object carrying device 150 so as to finalize the procedure of compensating the tilt angle.

Based on the above, in the method and system of detecting the tilt angle and the method and the system of compensating the same according to the exemplary embodiments of the disclosure, the positional relationship among a plurality of light spots on the object surface is obtained by utilizing the light source device and the image sensing device which are coaxially disposed, and spatial relationships (such a distance and a tilt angle) between the laser light source (or the processing equipment) and the object surface is adjusted through algorithm calculations, such that the detection device is not limited to the material composition of the object, the reflectivity and flatness of the object surface and capable of simultaneously measuring the tilt angles of two dimensions on the object surface. In addition, in the compensation method and system introduced by the exemplary embodiments of the disclosure, a processing equipment may be further installed, and the relative spatial relationship between the processing equipment and the object surface is adjusted according to the tilt angle obtained through the calculations. Accordingly, an effect and quality of processing the object may be enhanced so as to facilitate in industrial equipments which perform laser processing procedures.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of detecting a tilt angle of an object surface, comprising:
projecting a plurality of light beams by a light source device to an object surface, wherein a number of the light beams is greater than or equal to 3;
capturing an image of the object surface so as to obtain a plurality of light spots generated on the object surface by the light beams;
adjusting a vertical distance between the light source device and the object surface to execute a focus program so as to gather the light spots in a focal point on the object surface;
adjusting the vertical distance and calculating a correction angle between the light beams and the object surface according to the light spots; and
determining the tilt angle from the calculation of the correction angle.

2. The method according to claim 1, wherein the step of adjusting the vertical distance and calculating the correction angle between the light beams and the object surface according to the light spots comprises:
adjusting the vertical distance, such that the object surface reaches a predetermined measuring surface;
measuring a plurality of measured intervals between the light spots and comparing the measured intervals with a predetermined interval;
when the measured intervals are not equal to the predetermined interval, calculating the correction angle between the light beams and the object surface according to the predetermined interval, incident angles of the light beams, the measured intervals between the light spots and an adjusted value of the vertical distance.

3. The method according to claim 2, further comprising:
correcting the tilt angle of an light beam emitting surface of the light source device according to the correction angle.

4. The method according to claim 2, further comprising:
when the measured intervals are equal to the predetermined interval, not calculating the correction angle.

5. The method according to claim 2, wherein when the number of the light beams is equal to 5, an arrangement of a first through a fourth light spots generated by the light beams presents an equilateral rhombus on the same surface, and a fifth light spot generated by one of the light beams is arranged in a gravity center position of the equilateral rhombus, wherein the predetermined interval is an expected distance from one of the first through the fourth light spots to the fifth light spot, and the measured intervals are measured distances from one of the first through the fourth light spots to the fifth light spot.

6. The method according to claim 5, wherein when the incident angles of the light beams are 45 degrees, the correction angle of a first dimension is an arctangent function value of the measured intervals minus the predetermined interval being divided by the measured intervals.

7. The method according to claim 6, wherein one of the predetermined intervals is a tangent function value of the adjusted value of the vertical distance being multiplied by the incident angle of one of the light beams of the first dimension.

8. The method according to claim 5, wherein the correction angle of the first dimension is an arctangent function value of the measured interval minus the tangent function value of the incident angles of the light beams of the first dimension being multiplied by adjusted value of the vertical distance, then being multiplied by a cotangent function value of the incident angles and being divided by the measured interval.

9. The method according to claim 2, wherein when the number of the light beams is equal to 4, an arrangement of a first through a third light spots generated by the light beams presents an equilateral triangle on the same surface, and a fourth light spot generated by the light beams is arranged in a gravity center position of the equilateral triangle, wherein the predetermined interval is a half of each expected side length of the equilateral triangle, and one of the measured intervals is a half of a measured side length of two of the first through the third light spots.

10. The method according to claim 9, wherein each angle of the equilateral triangle has a predetermined angle, the measured intervals are distances between the second light spot and the fourth light spot being multiplied by a half of a cosine function value of the predetermined angle, and
wherein the correction angle located on a connection from the first light spot to the second light spot is an arctangent function value of one of the measured intervals minus a tangent function value of the incident angles of the corresponding to the first light spot and the second light spot being multiplied by the adjusted value of the vertical distance, then being multiplied by a cotangent function value of the incident angles of the light beams and being divided by one of the measured intervals.

11. The method according to claim 2, wherein when the number of the light beams is equal to 3, an arrangement of a first through a third light spots generated by the light beams presents a vertical isosceles triangle on the same surface, the first and the second light spots are located at acute vertices of the vertical isosceles triangle, and the third light spot is located at the endpoint of the vertical isosceles triangle, wherein the predetermined interval is an expected distance from one of the first light spot and the second light spot to the third light spot, and one of the measured intervals is a measured distance from one of the first light spot and the second light spot to the third light spot.

12. The method according to claim 11, wherein the correction angle located on a connection from the first light spot to the second light spot is an arctangent function value of the measured interval minus a tangent function value of the incident angle of the light beam corresponding to the first light spot being multiplied by the adjusted value of the vertical distance and then being divided by the measured interval.

13. The method according to claim 1, the step of executing the focus program comprises:
determining whether the light spots coincide in the focal point; and
when the light spots do not coincide in the focal point, adjusting the vertical distance and calculating the interval between one of the light spots so as to allow the light spots to coincide in the focal point.

14. The method according to claim 13, wherein the step of determining whether the light spots coincide in the focal point comprises:
measuring a plurality of first intervals between the light spots;
determining whether all the first intervals are equal to 0;
when the first interval are equal to 0, determining that the light spots coincide in the focal point to finalize the focus program; and
when the first interval are not equal to 0, adjusting the vertical distance along a first vertical direction and measuring a plurality of second intervals after the vertical distance is adjusted.

15. The method according to claim 14, wherein the step of adjusting the vertical distance and calculating the interval between the light spots so as to allow the light spots to coincide in the focal point comprises:
when the first intervals are not equal to 0, adjusting the vertical distance along a first vertical direction and measuring a plurality of second intervals after the vertical distance is adjusted;
when the second intervals are not equal to 0, calculating a difference value between the first interval and the second interval of the light spots;
when the difference values are positive, configuring the second intervals as the first intervals and adjusting the vertical distance along a second vertical direction, wherein the first vertical direction is reversed to the second vertical direction; and
when the difference values are negative, configuring the second intervals as the first intervals and adjusting the vertical distance along the first vertical direction.

16. A system of detecting a tilt angle of an object surface, comprising:
a light source device, projecting a plurality of light beams to an object surface, wherein a number of the light beams is greater than or equal to 3;
an image capture device, capturing an image of the object surface;
an axial direction controller, coupled to the light source device and adjusting angles of the light beams of the light source device projecting to the object surface;
an object carrying device, adjusting a vertical distance between the light source device and the object surface; and
a computing device, coupled to the image capture device and receiving the image so as to obtain a plurality of light spots generated on the object surface by the light beams, wherein the computing device calculates a correction angle between the light source device and the object surface according to the light spots, and the tilt angle is determined according to the calculation of the correction angle.

17. The system according to claim 16, wherein the computing device executes a focus program according to positions of the light spots, adjusts the vertical distance through the axial direction controller so as to gather the light spots in a focal point on the object surface.

18. The system according to claim 16, wherein the light source device and the image capture device are disposed coaxially.

19. The system according to claim 16, wherein when the number of the light beams is equal to 5, an arrangement of a first through a fourth light spots generated on the same surface by the light beams presents an equilateral rhombus on the same surface, and a fifth light spot generated by the light beams is arranged in a gravity center position of the equilateral rhombus, wherein the predetermined interval is an expected distance from one of the first through the fourth light spots to the fifth light spot, and one of the measured intervals is a measured distance from one of the first through the fourth light spots to the fifth light spot.

20. The system according to claim 16, wherein when the number of the light beams is equal to 4, an arrangement of a first through a third light spots generated by the light beams presents an equilateral triangle on the same surface, and a fourth light spot generated by the light beams is arranged in a gravity center position of the equilateral triangle, wherein the predetermined interval is a half of each expected side length of the equilateral triangle, and one of the measured intervals is a half of a measured side length of two of the first through the third light spots.

21. The system according to claim 16, wherein when the number of the light beams is equal to 3, an arrangement of a first through a third light spots generated by the light beams presents a vertical isosceles triangle on the same surface, the first and the second light spots are located at acute vertices of the vertical isosceles triangle, and the third light spot is located at the endpoint of the vertical isosceles triangle, wherein the predetermined interval is an expected distance from one of the first light spot and the second light spot to the third light spot, and one of the measured intervals is a measured distance from one of the first light spot and the second light spot to the third light spot.

22. The system according to claim 16, further comprising:
a processing equipment, coupled to the computing device, wherein the computing device corrects a relative positional relationship between the processing equipment and the object surface according to the correction angle.

23. A method of compensating a tilt angle of an object surface, comprising:
projecting a plurality of light beams by a light source device to an object surface, wherein a number of the light beams is greater than or equal to 3;
capturing an image of the object surface so as to obtain a plurality of light spots generated on the object surface by the light beams;
adjusting a vertical distance between the light source device and the object surface to execute a focus program so as to gather the light spots in a focal point on the object surface; and
adjusting and calculating a correction angle and the vertical distance between the light source device and the object surface according to the light spots.

24. A system of compensating a tilt angle of an object surface, comprising:
a light source device, projecting a plurality of light beams to an object surface, wherein a number of the light beams is greater than or equal to 3;
an image capture device, capturing an image of the object surface;
an axial direction controller, coupled to the light source device and adjusting angles of the light beams of the light source device projecting to the object surface;
an object carrying device, adjusting a vertical distance between the light source device and the object surface; and
a computing device, coupled to the image capture device and receiving the image so as to obtain a plurality of light spots generated on the object surface by the light beams,
wherein the computing device executes a focus program according to the light spots, adjusts the vertical distance through the axial direction controller so as to gather the light spots in a focal point on the object surface, calculates and adjusts a correction angle and the vertical distance between the light source device and the object surface according to the light spots.

* * * * *